(No Model.)
L. BELL.
REGULATOR FOR DYNAMO ELECTRIC MACHINES.
No. 510,465. Patented Dec. 12, 1893.
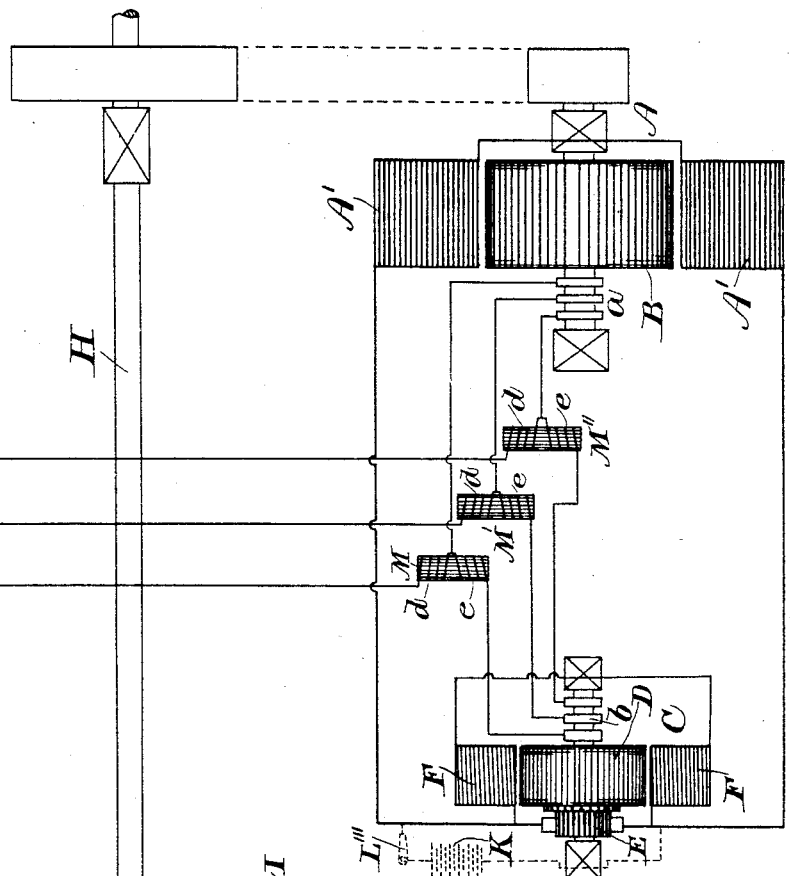
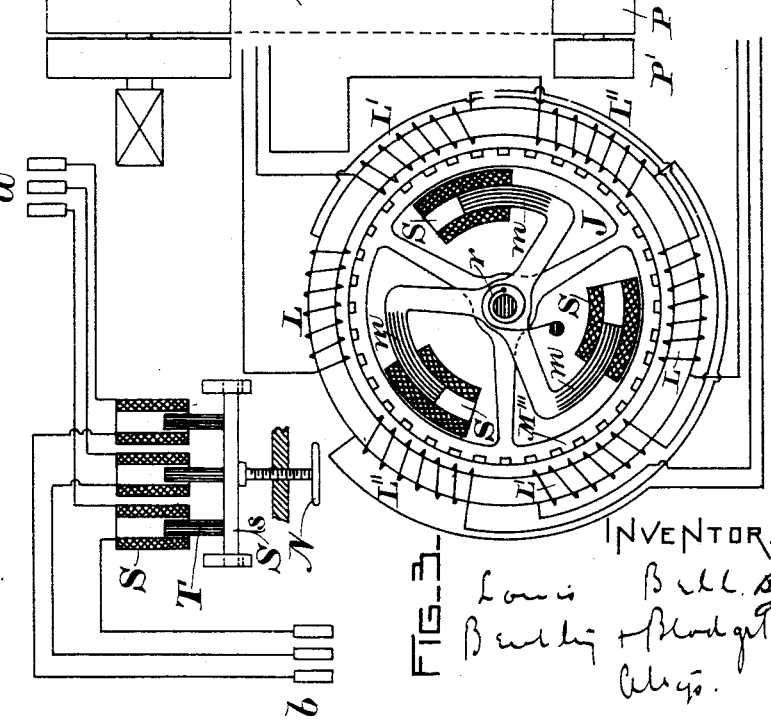
WITNESSES.
Alec F. Macdonald.
INVENTOR.
Louis Bell. By
Bentley & Blodgett
Attys.

UNITED STATES PATENT OFFICE.

LOUIS BELL, OF BOSTON, MASSACHUSETTS, ASSIGNOR TO THE GENERAL ELECTRIC COMPANY, OF SAME PLACE.

REGULATOR FOR DYNAMO-ELECTRIC MACHINES.

SPECIFICATION forming part of Letters Patent No. 510,465, dated December 12, 1893.

Application filed April 3, 1893. Serial No. 468,765. (No model.)

*To all whom it may concern:*

Be it known that I, LOUIS BELL, a citizen of the United States, residing at Boston, county of Suffolk, State of Massachusetts, have invented a certain new and useful Improvement in Regulators for Dynamo-Electric Machines, of which the following is a specification.

The present invention comprises what is deemed to be a desirable arrangement for securing the excitation of the field of dynamo electric machines, especially of the alternating or multi-phase type, which as is well known ordinarily have their fields separately excited, and need to be supplied with a direct current, and with satisfactory means of regulation. These ends I accomplish in general by providing a rotary transformer having an armature or driven member so wound as to be driven by the alternating or multi-phase currents delivered by the main machine, and by which the currents are commuted or rectified, when they are passed through the field of the main machine to secure the necessary excitation. Regulation is secured by including in the circuit's coupling the armatures of the two machines, inductive resistances or reactive coils, whose inductance is varied to suit given conditions, and which by controlling the current delivered to the transformer results in regulating the main machine, since it is characteristic of such machine that the voltage at the commutator end of the machine will always remain closely proportional to the impressed electro-motive force. To secure compounding or over-compounding effects at the main machine automatically, when these results are desired, reversely wound reactive coils are provided between the armatures of the machines, which have two branches, one leading to the main circuit and so traversed by the current passing to the main circuit, while the other leads to the transformer. Hence the amount of current demanded by the load at any given time has the effect of varying proportionally the inductive resistance in the transformer branch, and by properly proportioning the windings of the coils, the desired compounding or over-compounding effects will be obtained.

In the accompanying drawings which illustrate apparatus forming one embodiment of the invention, Figure 1 shows diagrammatically an installation arranged as herein proposed. Fig. 2 illustrates a modified form of regulator, and Fig. 3 shows an automatic regulator comprising adjustable choking coils.

The main generator A has field magnets A' which are separately excited, and an armature B wound and provided with the necessary terminals $a$ for delivering alternating or multi-phase currents. As herein shown the currents delivered are supposed to have three phases.

To excite the field of the machine a rotary transformer C is provided whose armature D has a proper winding adapting it to be driven by three-phase currents, which are received from the main machine and enter at terminals $b$, which are connected with the corresponding terminals $a$ by circuit wires. The current leaves the machine as a direct current, the rectification being performed by a commutator E or other suitable means. The direct current thus obtained is used to excite the field F of the transformer, and also the field A' of the main dynamo. When the plant is once in normal operation the main machine will thus furnish current to drive the transformer, and this last machine will act as an exciter for the former.

To start up the machine initially, the exciter may be driven from a separate source of power, for which purpose there is illustrated a fast pulley P upon the armature shaft of the transformer, which may be driven from the same source of power that drives the armature of the main machine, through a shaft H, together with pulleys and belts, as is indicated on the drawings. When the transformer is under speed, the driving belt I may be shipped on to a loose pulley P', or otherwise disconnected. Instead of this mechanical means for driving the transformer the field of the main machine may be initially excited by current from a storage battery K connected with the field circuit of the main machine, as indicated in dotted lines, and which may be cut in or out by a switch L'''.

The main or working circuit O is illustrated as a three-wire circuit suitable for a three-phase current distribution system.

Transformers are indicated at R, R', R''.

To regulate the supply of current and keep it proportional to the demands of the work circuit, inductive resistances or reactive coils are provided in the circuits connecting the armatures of the two machines, by which the current entering the transformer and that delivered to excite the field of the same machine, may be varied at will, and that too without the loss of power incident to the use of ordinary dead resistance. One means of such regulation designed for manual control is shown in Fig. 2, where in each of the circuits connecting the terminals $a$ with the terminals $b$, there is located a coil S, and cores T, which are shown connected to a bar $s$, may be advanced into or withdrawn from the coils by a hand-wheel N, thus regulating the current in each of the circuits simultaneously and to a like extent, so as to preserve their proper mutual working relation.

To secure the compounding or over-compounding effects which are desirable in the ordinary multiple arc distribution system, so as to maintain the requisite potential under varying loads, the arrangement shown in Fig. 1 may be employed, where M, M', M'' are reactive coils which have oppositely wound branches connected to the terminals $a$ of the main machine, one branch $d$ leading to the main circuit, and the other branch $e$ leading to the transformer. When the number of translating devices supplied with current is small, the counter magnetizing effect of the branch $d$ will be correspondingly small, and hence the inductive resistance to the flow of current through the branch $e$ great. As the current flowing into the working circuit increases, the inductive resistance limiting the current supplied to the transformer, is decreased with the final result of increasing the field excitation of the main machine. In this way any desired compounding effects are secured by giving proper proportions to the reactive coils.

Instead of the differentially wound reactive coils shown in Fig. 1, or the manually adjustable coils shown in Fig. 2, I may make use of automatically adjustable choking coils actuated responsively to changes of current in the main circuit by means of relay or other apparatus. One method of doing this is shown in Fig. 3. This consists of a rudimentary multiphase induction motor J, the field of which is excited by a few series turns from the main lines, which are shown at L, L', L''. The armature M''' carries laminated cores $m$ moving with the armature, and adjustable with reference to fixed choking coils S through which the current that supplies the rotary transformer passes in the same manner as in Fig. 2. As the field of this motor is strengthened the torque produced in the armature is utilized, acting against a proper set of springs $r$, to vary the inductance in the fixed choking coils in such wise as to hold the voltage of the generator approximately steady. It goes without saying that the coils can be movable and the cores fixed if preferable. This is only one of many ways of making the choking coils self-adjusting with respect to the load on the generator, but is on the whole the preferred form, if an adjustment by movable cores rather than by differentially wound choking coils is desirable.

What I claim as new, and desire to secure by Letters Patent, is—

1. The combination of a dynamo electric machine of the alternating or multi-phase type, with a rotary transformer coupled in circuit so as to be driven by alternating or multi-phase currents received from the main machine, and supplying a commuted or rectified current which excites the field of the main machine, as set forth.

2. The combination of a dynamo electric machine, with a rotary transformer driven by alternating or multi-phase impressed currents received from the main machine, and delivering a direct current which excites the field of the main machine, and inductive or reactive means for regulating the current driving the transformers, as set forth.

3. The combination of a dynamo of the alternating or multi-phase type, with a rotary transformer exciting the field of such main machine, and driven by current therefrom, and regulating mechanism responsive automatically to the current passing to the main circuit for governing the supply of current to the transformer.

4. The combination of a dynamo electric machine, a rotary transformer serving as an exciter for the main machine and driven by alternating or multi-phase currents received therefrom, and one or more reversely wound reactive coils whose branches are included respectively in the main circuit, and in the driving circuit of the transformer, whereby desired compounding or over-compounding effects at the main machine are secured.

5. The combination of an electric generator of the multi-phase type having a separately excited field, with a rotary transformer driven by impressed currents from the main generator, and exciting the field of the main machine with direct currents, and regulating mechanism for varying the excitation so produced, as set forth.

In testimony whereof I have hereunto set my hand this 18th day of March, 1893.

LOUIS BELL.

Witnesses:
   W. H. BENTLEY,
   H. J. LIVERMORE.